Sept. 21, 1926.
S. C. HATFIELD
1,600,586
TIRE MOLD
Filed Nov. 17, 1922    2 Sheets-Sheet 1
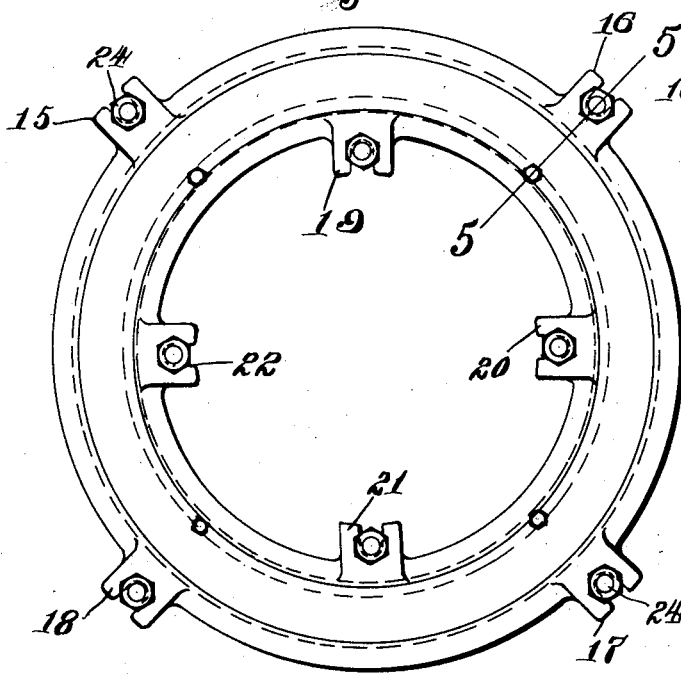
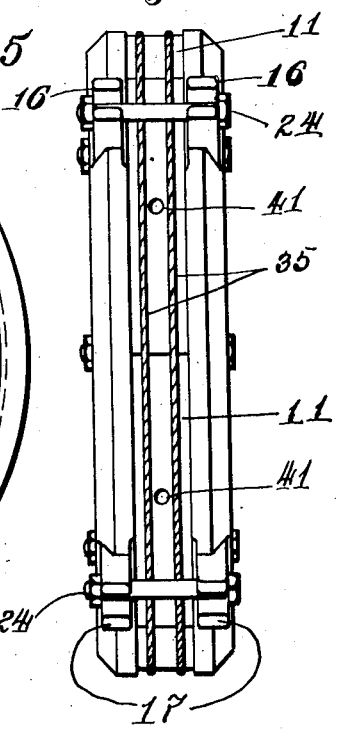
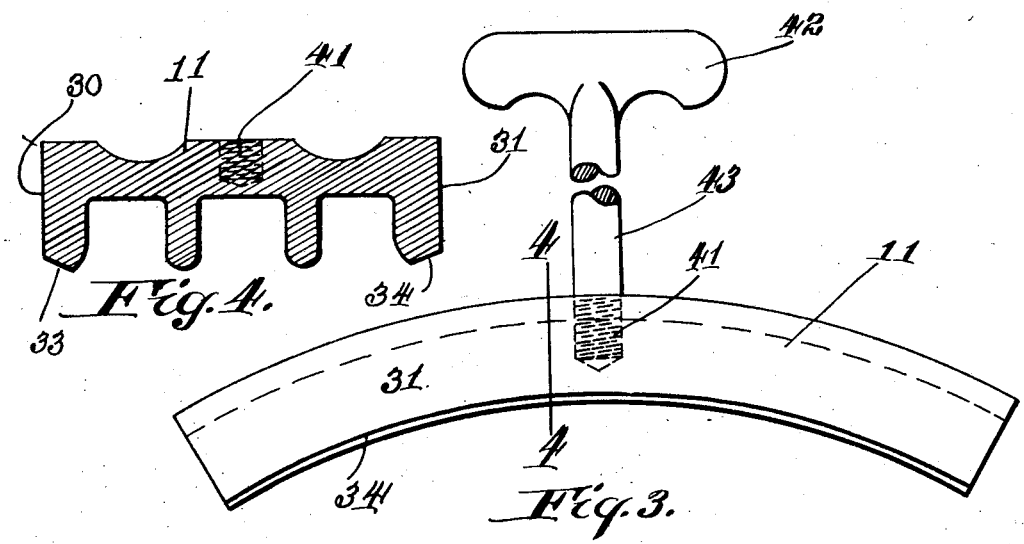

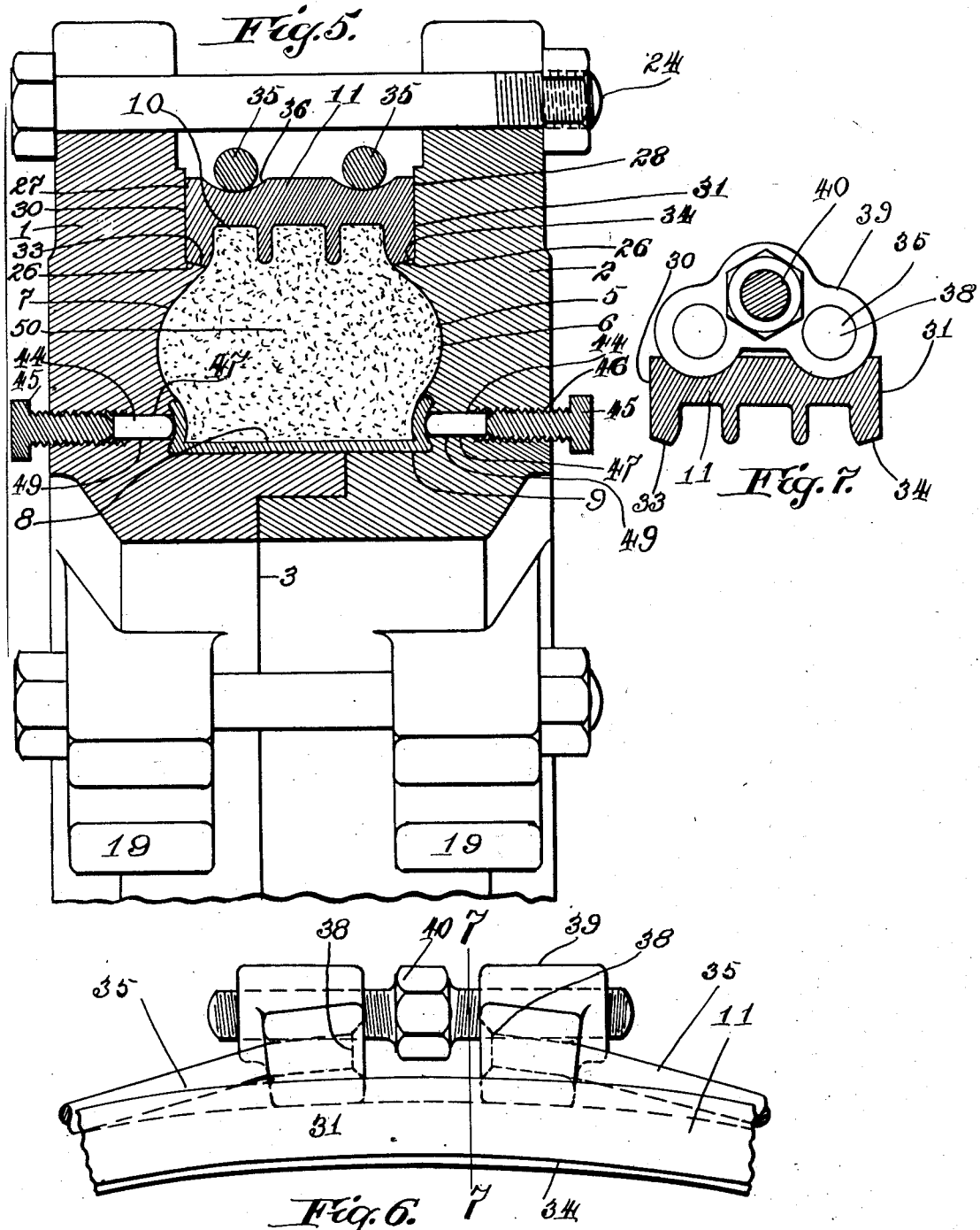

Patented Sept. 21, 1926.

1,600,586

UNITED STATES PATENT OFFICE.

SCHUYLER C. HATFIELD, OF BALTIMORE, MARYLAND.

TIRE MOLD.

Application filed November 17, 1922. Serial No. 601,659.

The present invention relates to the production of rubber tires and particularly to the production of a tread having deep indentations. The majority of rubber tires are in accordance with the present practice, made in molds which are split on a plane at right angles to the wheel axis, the mold sections when the tire is completed being necessarily removed in the direction of the axis. Having particular reference to the rough tread tires known as non-skid, one of the principal difficulties encountered in molding is incident to the production of a satisfactory tread of this type, and an important object of the present invention is to produce such a tread more perfect and having deeper indentations and to produce it more easily and at a smaller cost than previously.

The principal difficulties incident to the present practice in this particular connection are involved in the removal of the tire from the mold. As the indentations extend at right angles to the axis or radially and the mold sections are removed in the direction of the axis, the serrations or portions of rubber surrounding the indentations are subject to excessive stress at this time and to accomplish this operation with as little loss as possible, the molds are removed hot when the rubber is softest and most pliable and there is the least tendency to stick and injure the tread by removal of portions thereof with the mold, but in spite of this practice and the precautions taken, such injuries to the tread are of regular occurrence.

Numerous tires are sold as seconds on this account, and great difficulty in operation and loss of efficiency and expense for labor are encountered on account of the necessity for handling the heavy mold sections while hot.

The present invention relates to a tire mold in which the difficulty as to the formation of the non-skid tread is almost completely avoided by forming the tread portion of the mold in such a way as to make it separate from the rest of the mold and in small sections which may be removed radially so that there is no tendency to injure the roughened tread portion of the tire, the relative motion on removing the mold sections being in the direction of the contacting surfaces which form the sides of the indentations, projections or serrations instead of at right angles thereto. Under these circumstances there is no necessity for removing the mold sections while hot, which greatly reduces the difficulty and expense of handling the mold, and the tread may be made with much deeper serrations than by any previous method.

In the accompanying drawings I have illustrated a tire mold constructed in accordance with my invention.

In the drawings:

Figure 1 is a side elevation of the mold assembled, looking in the direction of the axis of the wheel.

Fig. 2 is an elevation of the same taken at right angles to Figure 1.

Fig. 3 is a side view of a mold section on a larger scale.

Fig. 4 is a section on the line 4—4 of Fig. 3.

Fig. 5 is a section on the line of 5—5 of Fig. 1 on an enlarged scale.

Fig. 6 is a side elevation of a fragmentary nature and likewise on an enlarged scale, showing a tread section with the meeting ends of the tension member by which the treads are held in position.

Fig. 7 is a section on the line 7—7 of Fig. 6.

Referring to the drawing by numerals; the mold as shown consists of two ring sections 1 and 2, see particularly Fig. 5 which meet along their inner periphery in a circumferential joint 3, which is shown in the form of a step joint, though this joint may be of any preferred form within the scope of the invention. The ring sections are substantially duplicates of each other and corresponds as to the meeting surfaces of the joint. These ring sections as hollowed out as to their opposed or neighboring surfaces form an annular chamber 5, adapted to enclose and form a tire, but this chamber 5, is enclosed by these two ring members only as to the side walls on side surfaces 6 and 7, the inner or rim contacting surface 8, being in the form illustrated, vulcanized into the rim 9 itself, which is enclosed within the mold and the tread surface 10, being formed by the separate tread mold member 11, between the ring sections 1 and 2. This tread mold member as shown constitutes a complete ring intervening and held between the ring sections 1 and 2, but it is made in arcuate sections which are preferably sufficiently numerous so that the entire tread mold may be removed substantially in a radial direction.

Referring to the structure more in detail, the ring sections 1 and 2, are held in closed or assembled position by means of outwardly projecting ears 15, 16, 17, and 18, and inwardly projecting ears 19, 20, 21, and 22 on the two ring sections, the ears on the two sections being adapted to register in the assembled position of the mold and being slotted or otherwise apertured to receive bolts 24, one of which is passed through each pair of ears on the two respective rings, the bolts being parallel to the axis of the tire and serving to hold the ring sections together.

The ring sections 1 and 2, are provided at the outer determination of the mold surfaces 6 and 7, thereon with peripheral shoulders 26 on the opposed faces of the rings adapted to receive and support the tread mold sections 11, and with flat radial peripheral surfaces 27 and 28 on the respective ring sections, adapted to engage and position the side edges, and the tread sections 11, having corresponding flat annular or peripheral side faces 30 and 31 to engage the surfaces 27 and 28, of the ring members 1 and 2, and shoulders 33 and 34 joining and substantially at right angles to said side surface which shoulders engage the shoulders 26 on the ring member. As shown the shoulders on both members are slightly inclined to better provide for the positioning of the parts.

As shown the tread members 11, are held by encircling cords or cables 35 in circumferential grooves 36, in the outer surfaces of the tread members. These tension members or cables 35, are secured at their ends at 38, in turn buckles or similar clamps 39, which serve to apply tension to the cables by means of a right and left handed screw threaded bolt 40.

As shown the tread sections 11, are provided each with a screw threaded socket 41 in each by means of which handles or grips 42, having screw threaded shanks 43, to fit such sockets are secured. These grips are used in handling and withdrawing the tread sections particularly they are used in removing the tread sections after the molding operation.

In Figure 5, I have shown means for loosening the tire and a rim from the ring mold. This consists of a plurality of pins 44, seated in holes 49 in the respective rings 1 and 2, to slide parallel to the axis, i. e. at right angles to the molding surfaces of these rings and as shown bearing on the rim member 9, to and into which the tire is vulcanized. In the present instance, these pins as shown are four in number in each ring, eight in all, and each of them is actuated by a corresponding screw bolt 45, seated in a threaded aperture 46, which is an extension of and an alignment with the straight aperture 47 in which the pin is mounted to slide, the screws of course being outside so they can force the pins inward against the rim or tire to release it or separate it from the mold.

In operation, the ring members 1 and 2, are assembled about the raw rubber tire 50, and the rim 8, in which the tire is seated, the sides of the tire in this condition being a little full and the tread a bit scant. As it is desirable to have the tread portion flow freely into the mold, the tread sections of the mold are heated, but this is the only part of the mold it is necessary to heat before assembling. In this way almost the entire expense incident to heating the mold and handling the heavy mold sections hot is saved as the tread sections are small and easy to handle and have special removable grips for this purpose.

After baking or vulcanizing, the tire can be allowed to remain in the mold as long as convenient. A better product is produced by permitting the tire to cool in the mold. As it is necessary to remove the tread portion of the mold sidewise, i. e., in the direction of the axis, a tread with deeper depressions, or longer or higher projections than those in the tread of any tires now being made can be produced without injury to the tread and any type of rough tread can be produced with less expense and with a smaller portion of defective tires than by any other apparatus now in use, and because of the fact that all of the heavy parts can be handled cool, the apparatus can be operated more economically than any other equipment for this purpose now known.

I have thus described specifically and in detail a single embodiment of my tire mold in order that the nature and operation of same may be clearly understood, however, the specific terms herein are used descriptively rather than in a limiting sense, the scope of the invention being defined in the claims.

What I claim and desire to secure by said Letters Patent is:

1. A tire mold consisting of two ring members having annular molding surfaces to form the side walls of a tire and a tread mold adapted to fit between said ring members which are provided with positioning means to engage the tread mold member, means for drawing the ring members together in the direction of their axis, the tread mold member being formed in sections so that each section can be removed in a radial direction and circumferentially-arranged flexible tension means for holding the sections in position, and means for taking up on said tension means to apply inward radial pressure to said sections of the tread mold members.

2. A tire mold for rough tread tires consisting of two ring members having annular molding surfaces to form the side walls of a tire, means for drawing same together in the direction of the axis and a tread mold having a roughened mold surface and adapted to fit between said ring members which are provided with positioning means to engage the tread mold member, the tread mold member being formed in sections so that it can be removed in a radial direction and circumferentially arranged flexible tension means for holding said mold sections in position and means for taking up on said tension means.

3. A tire mold for rough tread tires consisting of two ring members having mold surfaces for the side walls of the tire means for drawing the ring members together, a tread mold to fit between said ring members consisting of a plurality of arcuate sections having a serrated mold surface, and flexible tension means extending around the tread member in a circumferential direction for holding the sections of the tread member in position and a threaded member for taking up on said flexible tension member.

4. A tire mold consisting of two ring members having opposed surfaces to form the side walls of a tire and being also formed to receive and support a metal rim on which the tire is formed, a tread mold member consisting of a plurality of completely separable arcuate sections adapted to be removed in a radial direction and positioning means on the side walls for the tread mold member, the tread members having each a socket and a key engaging said sockets whereby the arcuate sections may be handled and removed when hot.

5. A tire mold consisting of two ring members having opposed surfaces for the side walls of a tire and being also formed to receive and support a metal rim on which the tire is formed, a tread mold member consisting of a plurality of completely separable arcuate sections, each adapted to be removed in a radial direction and positioning means on the side walls for the tread mold member and a flexible tension member encircling said tread member and means in the form of a screw for applying tension thereto to hold the tread member in position and means for securing the ring members together.

Signed by me at Baltimore, Maryland, this 26th day of October, 1922.

SCHUYLER C. HATFIELD.